United States Patent [19]

Clapp et al.

[11] Patent Number: 5,545,391
[45] Date of Patent: Aug. 13, 1996

[54] REMOVAL OF HYDROGEN SULPHIDE

[75] Inventors: Phillip A. Clapp, Kingswood, Great Britain; Dennis F. Evans, deceased, late of London, England; Antonia F. E. McKenna, executrix, County Derry, Northern Ireland

[73] Assignee: Solvay Interox Limited, Warrington, England

[21] Appl. No.: 185,896

[22] PCT Filed: Jul. 20, 1992

[86] PCT No.: PCT/GB92/01328

§ 371 Date: Apr. 14, 1994

§ 102(e) Date: Apr. 14, 1994

[87] PCT Pub. No.: WO93/02961

PCT Pub. Date: Feb. 18, 1993

[30] Foreign Application Priority Data

Jul. 27, 1991 [GB] United Kingdom .................. 9116258

[51] Int. Cl.$^6$ .......................... C01B 17/02; C01B 15/022
[52] U.S. Cl. ........................................ 423/573.1; 423/587
[58] Field of Search .................................. 423/573.1, 587

[56] References Cited

U.S. PATENT DOCUMENTS 3,923,966  12/1975  Vaughan ............................. 423/573.1
4,581,128  4/1986  Plummer et al. .................... 423/573.1
4,592,905  6/1986  Plummer et al. .................... 423/573.1
5,180,572  1/1993  Plummer ............................. 423/573.1

*Primary Examiner*—Wayne Langel
*Attorney, Agent, or Firm*—Larson and Taylor

[57] ABSTRACT

Hydrogen sulphide can be removed from a gaseous stream by contact with a 2,3-dialkyl substituted naphthoquinone in the presence of a catalytic amount of an amine catalyst dissolved in a hydrophobic organic solvent system, with consequential formation of a corresponding quinhydrone and insoluble elemental sulphur. Preferably the total number of carbons in the alkyl substituents is from 2 to 6. Particularly suitable compounds comprise dimethyl and/or ethyl/ methyl naphthoquinones. Preferably the amine catalyst has a pK in the range of about 9 to 11.5. Preferred solvent systems comprise mixtures of aromatic hydrocarbons with aliphatic esters such as methyl cyclohexanol acetate or dialkylketones such as diisobutylcarbinol. Advantageously, the naphthoquinone react with hydrogen sulphide significantly faster than do the anthraquinone or tetrahydroanthraquinone compounds hitherto proposed. The insoluble sulphur can be recovered as product and the resultant solution containing a reduced species, believed to be naphthoquinhydrone, can be contacted with an oxygen-containing gas for generation of hydrogen peroxide and reformation of the naphthoquinone. After extraction of the hydrogen peroxide with water, the organic solution is available for contact with further hydrogen sulphide.

18 Claims, No Drawings

REMOVAL OF HYDROGEN SULPHIDE

The present invention relates to a process for the removal of hydrogen sulphide from a gaseous stream containing it and in a development thereof to the incorporation of that process as one stage of a process for generating hydrogen peroxide from hydrogen sulphide and oxygen.

Hydrogen sulphide is produced as a by-product or present as an impurity in feedstocks on a significant scale in a number of important industries, including the petroleum, natural gas, electricity generating and chemical synthesis industries. It is not only a foul smelling gas, but it is also poisonous so that it must be removed from effluent streams before they can discharged to atmosphere or into watercourses. Accordingly, the generation of hydrogen sulphide imposes upon the afore-mentioned industries additional costs of treating the gaseous effluents. It would be desirable to obtain a vendible product from the hydrogen sulphide, thereby transforming a cost-incurring waste material into a valuable feedstock.

In U.S. Pat. No. 3,311,453, to George R Lusby, hydrogen sulphide is caused to react with an aqueous alkaline solution of a salt of an anthraquinone disulphonic acid, generating solid sulphur and a reduced anthraquinone compound which is subsequently oxidised to regenerate the anthraquinone sulphonic acid and form hydrogen peroxide in solution. Recovery of sulphur from the solution can be effected easily by conventional centrifugation or filtration techniques, but recovery of hydrogen peroxide from the process is rendered more complicated because both hydrogen peroxide and the anthraquinone salt are water soluble. The proposed solution, namely conversion of soluble hydrogen peroxide to calcium peroxide, a poorly water-soluble compound, though possible, is cumbersome and requires an additional reaction step as well as the provision of lime. Moreover, the process is reported to suffer from further less apparent disadvantages, including a significant loss of anthraquinone by carry-out with precipitated calcium peroxide.

In U.S. Pat. No. 3,923,966, Lawrence G Vaughan, assigned to Du Pont has described a process in which in a first step, hydrogen sulphide is caused to react with an alkyl-substituted anthraquinone or hydrogenated derivative thereof in the presence of an amine catalyst, thereby reducing the anthraquinone to the corresponding anthra-hydroquinone and generating solid sulphur and in a second step the anthrahydroquinone is reacted with oxygen, forming hydrogen peroxide and regenerating the anthraquinone. The reaction is carried out in an organic hydrocarbon-based solvent system from which the product, hydrogen peroxide can be recovered by water-washing. It will be recognised that the Vaughan process employs the compounds which are currently employed commercially for the generation of nearly all the world's hydrogen peroxide, namely alkyl substituted anthraquinones or their hydrogenated derivatives in cyclic autoxidation (AO) processes based upon hydrogen as reductant to the exclusion of other quinones.

According to the present invention, there is provided a process for the production of elemental sulphur from hydrogen sulphide in which hydrogen sulphide is brought into contact with a reducible quinone compound dissolved in a non-aqueous solvent system in the presence of an organic amine catalyst and maintained in contact until at least some sulphur precipitates out of solution characterised in that the reducible quinone compound comprises a 2,3-dialkyl substituted naphthoquinone.

By appropriate selection of the alkyl substituents it is possible to reduce the naphthoquinone compound at a faster rate with hydrogen sulphide than using the known anthraquinone or anthrahydroquinone compounds under the same conditions.

In a related second aspect of the present invention there is provided a cyclic process for the generation of hydrogen peroxide in which in the first step hydrogen sulphide is brought into contact with a reducible quinone compound dissolved in a non-aqueous solvent system in the presence of an organic amine catalyst and maintained in contact until at least some sulphur precipitates out of solution, thereby reducing at least a part of the quinone in solution to a reduced species in a second step contacting the reduced species in solution with an oxygen-containing gas, thereby oxidising at least a part of the reduced species to quinone and forming hydrogen peroxide and in a third step recovering the hydrogen peroxide from the solvent system characterised in that the reducible quinone compound comprises a 2,3- dialkyl substituted naphthoquinone.

Advantageously, the use of the selected naphthoquinone compounds instead of the known anthraquinone or anthrahydroquinones in the cyclic process for generating hydrogen peroxide described by Vaughan not only enables the reduction stage to proceed more quickly, but also does not impair the oxidation step compared with using the anthraquinone and at least some selected naphthoquinones can even accelerate that step as well.

It is believed that the reduced species obtained by reduction of naphthoquinone with hydrogen sulphide is a quinhydrone, by analogy with the reduction of quinones with hydrogen and in view of the ability of the reduced species to be oxidised with oxygen to reform the naphthoquinone and in subsequent references herein, the reduced species is called a quinhydrone or naphthoquinhydrone for convenience. However, if analysis were to indicate that the reduced species formed from the naphthoquinones in the reduction step is wholly or partly an alternative oxygen oxidisable reduced species, instead of a quinhydrone, then the references to naphthoquinhydrone correspondingly include such alternative or additional species.

The total number of carbon atoms in naphthoquinones employed in the present invention is preferably not greater than 18. Consequently, the total number of carbons in the two alkyl substituents at the 2,3 positions of the naphthoquinone is preferably selected in the range of from 2 to 8 and more preferably from 2 to 6. Each alkyl substituent may conveniently be selected from any alkyl group from methyl through to amyl and may be linear or branched. It is preferable for no more than one of the alkyl substituents to be bulky. Although the two alkyl substituents may be identical, such as dimethyl or diethyl, it is advantageous for them to be different and by so doing, the resultant compound enjoys a higher solubility in a number of solvent systems, thereby enhancing the production capacity of the process for a specified size of plant. In some desirable embodiments, one of the substituents is methyl and the other is selected from ethyl, propyl, butyl, iso-butyl, t-butyl, amyl or iso-amyl. In addition, a mixture of two or more of the selected naphthoquinones can be employed. It will be recognised that variation in the length of the alkyl substituents alters the relative rates of reduction and oxidation of the naphthoquinone compounds, the longer the linear length of the substituent, the faster the oxidation reaction. One especially suitable compound comprises 2-methyl,3-ethylnaphtho-1,4-quinone.

It will be further recognised that the naphthoquinone compounds which are essentially substituted at both the 2 and 3 positions may additionally be substituted at any one or more of the 5, 6, 7 or 8 positions around the nucleus by an alkyl group, and preferably an alkyl group containing not more than 5 carbons. However, any such additional alkyl substituents should preferably be so selected that the total number of carbons in the compound does not exceed 18.

The non-aqueous solvent systems which can be employed in the present invention comprise those which are suitable for use in known AO processes employing hydrogen as the reductant and a polynuclear quinone compound, such as a substituted anthraquinone compound as the compound which is alternately reduced and oxidised. Such a process herein subsequently may be referred to as a conventional AO process. A wide range of solvent systems have been described, sharing the feature of relatively poor solubility in aqueous hydrogen peroxide solutions. In practice, they usually comprise at least two components, one of which often comprises a hydrophobic high boiling liquid such as hydrocarbons, typically a fraction from the distillation of oil, and the other component often comprises a more hydrophilic solvent such as an ester, ketone or alcohol. The ratio of the two solvent components is at the discretion of the process user. In most practical embodiments,.the ratio is chosen within the volume ratio range of 80:20 to 20:80 and in many instances within the tighter range of 2:1 to 1:2.

The more hydrophobic solvent is often an aromatic hydrocarbon or mixture of hydrocarbons, such as distillation fractions boiling in the range of from about 150° C. to about 300° C. These include alkyl substituted naphthalenes. The more hydrophilic solvent can conveniently be selected from medium chain aliphatic alcohols, such as heptanol to decanol, or aliphatic esters containing 8 to 10 carbons in total, dialkyl or diaryl or tri alkyl ester derivatives of phosphoric acid, alkyl esters of cyclohexanol or an alkyl substituted cyclohexanol, or a dialkyl ketone such as diisobutylketone.

The reaction between hydrogen sulphide and naphthoquinone is carried out in the presence of an amine catalyst. By way of simple and approximate guidance, the catalyst may conveniently comprise those amino catalysts which have previously been considered for the corresponding reaction with an anthraquinone. The amine may be selected from primary secondary or tertiary amines, but in practice it is often most convenient to choose a tertiary amine on account of its comparatively poor solubility in aqueous solution. The substituents are often alkyl or cyclo-alkyl and though they can be different from each other, they are often the same. The alkyl may be linear or branched and the cyclo-alkyl may itself be alkyl substituted. Specific examples include trialkylamines such as tri-n-butylamine and tri-n-octylamine and N,N'-dimethylethanolamine. The amine nitrogen atom can form part of a heterocycle such as pyridine or piperidine,as for example in 4-dimethylaminopyridine and 1,2,2,6,6-pentamethyl piperidine. The overall number of carbons in the amine is usually at least 4 and often not greater than 30.

The amine catalyst is preferably selected on the basis of its pK, desirably having a pK of at least 7.8, and often not greater than 12.4. Many preferred amines have a pK in the region of about 9 to 11.5. It is particularly preferable to select amines which not only have the above specified pK, but additionally enjoys good solubility in the organic solvents and poor solubility in aqueous hydrogen peroxide solutions. By making such a selection, for example tertiary amines containing at least one hydrophobic substituent, such as an alkyl group containing at least 9 carbons, losses of catalyst during subsequent processing stages can be minimised.

The concentration of amine catalyst to employ is at the discretion of the process user. In many instances, its concentration will be selected in the range of from 0.1M to that of a saturated solution in the solvent system at the lowest temperature employed. This will self-evidently depend upon the solvents and the amine selected. For many combinations, the amine concentration will be not greater than about 5% w/w.

The reduction may be continued until all the naphthoquinone has been reduced. Alternatively, it is possible to terminate the reduction stage earlier, for example when at least half of the quinone has been reduced, such as from half to 90%.

The reduction is normally conducted at an elevated pressure, which is often selected in the region of from 1 to 20 atmospheres.

The reduction is conveniently conducted at a temperature in the range of from about 10° to 60 C. and in many instances between about 20° and 50° C.

The residence time of the naphthoquinone solution in the reduction stage is to at least some extent at the discretion of the process user and the time selected will depend upon a number of factors, including the design of the reduction vessel and its capability to mix the gaseous hydrogen sulphide with naphthoquinone solution and to promote its transfer into the liquid phase, the temperature at which the reduction is carried out, the concentration and choice of catalyst in the solution, the concentration and choice of naphthoquinone and the proportion of naphthoquinone which it is desired to reduce during the reduction stage. In many practical instances, the residence time will be selected within the range of from about 5 to 100 minutes, but it will be recognised that it is possible to operate similar processes outside that range.

As a result of the reaction between hydrogen sulphide and the naphthoquinone, elemental sulphur is produced, normally as a particulate solid. It is preferable for the reactor in the reduction stage to be free from packing and for the organic solution to sweep any such solids out of the reactor. The reactor may conveniently comprise a tubular or like design in which the gas and solution are brought together in either co or counter-current fashion, particular for continuously operated reactions. It is most convenient for excess hydrogen sulphide gas to be introduced into the reactor, relative to the rate at which the naphthoquinone is introduced into the reactor, and for unreacted excess gaseous hydrogen sulphide to be separated from the organic solution and recycled.

The sulphur can be separated subsequently from the organic solution of naphthoquinhydrone and any residual naphthoquinone by conventional separation apparatus. This includes centrifugal devices and drum and filter presses, the choice being at the discretion of the process user and dependent at least partly upon the nature of the process, particularly whether it is a batch or continuously operated. The sulphur thus obtained may be washed with solvent both to purify it and to recover residual amine catalyst and naphthoquinone compounds. The washings may subsequently be employed, either as such or after further treatment to recover the amine and naphthoquinone, such as distillation or freeze/thaw separation from the solvent.

The organic solvent phase, whether it has been separated from elemental sulphur or not, may be contacted with an oxygen-containing gas, which may comprise air, oxygen-enriched air or pure oxygen, such as a gas comprising from about 20 to 100% oxygen by volume and the balance a non-reducing constituent. However, inclusion of a preceding sulphur removal step is preferable, thereby avoiding product losses arising from reaction with sulphur. The oxidation step may conveniently be operated in a similar manner to that employed, or described for employment, in a conventional AO process for making hydrogen peroxide, due allowance in calculating the residence time in the oxidation vessel being made for the fact that the quinhydrone present is a substituted naphthoquinhydrone instead of an anthraquinhydrone, and which naphthoquinhydrone it is. At this stage, the naphthoquinhydrone produced in the reduction stage is oxidised back to the starting naphthoquinone. It is preferable for the oxidation stage to be continued until all the naphthoquinhydrone has been oxidised.

A wide range of variations are possible in the oxidation stage at the user's discretion. In addition to the proportion of oxygen in the oxidising gas, the gas can be passed in co-current or counter-current to the solvent, the vessel itself may be packed or free from packing and can in many instances be provided with cooling means such a water-cooled jacket to maintain the temperature of the organic solution within desired limits. In general, the solution temperature during the oxidation stage does not exceed about 60° C. and is usually at least 20° C. The contact period of oxygen and solution is normally controlled such that the naphthoquinhydrones are completely oxidised and to that end is selected in the range from about 5 to 100 minutes in accordance with the prevailing conditions, including temperature, proportion of naphthoquinhydrone needing oxidation and partial pressure of oxygen in the oxidising gas.

The recovery of hydrogen peroxide from the organic solution can be achieved using the same technology developed for the autoxidation process. In essence, the organic solution is brought into contact with water, preferably having a pH not lower than about 5, and maintained in contact until the hydrogen peroxide has transferred to the aqueous phase. Naturally, the extraction apparatus is preferably tailored so as to permit substantially all the hydrogen peroxide to be extracted from the organic phase. It will further be recognised that to at least some extent the oxidiser and extraction stages may be combined, that is to say oxidation may take place in the presence of an aqueous phase, for example as a result of water being introduced into the oxidiser at an intermediate point. By so doing. it is possible to effect a measure of cooling of the organic solution during the oxidation stage without or in addition to that provided by external cooling jackets.

The aqueous hydrogen peroxide solution can thereafter be concentrated by distillation, freeze/thaw or topping off techniques and/or can be purified for residual organic solvent, naphthoquinone compounds and degradation products thereof, by the techniques hitherto proposed for the known autoxidation processes. The organic solution is available for recycle to the reduction stage for contact with further hydrogen sulphide.

As an alternative method of recovering hydrogen peroxide, it can be reacted in situ with a suitable alkaline earth salt, such as in particular calcium oxide in order to generate a substantially insoluble alkaline earth metal peroxide which can be physically separated out. Such an arrangement would be suitable if the invention process were located at a site at which substantial consumption of the metal peroxide was contemplated.

It will be recognised that the process of the present invention may be carried out batchwise, but that it is eminently suited to continuous operation, the solution of naphthoquinone being constantly recycled from reduction to oxidation to hydrogen peroxide stages. In practice, the solution is monitored and losses of either solvent or naphthoquinone are restored either periodically or after each cycle.

The process of the present invention is most preferably carried out in materials that are essentially inert to the various reactants employed. On a small demonstration scale, glassware may be used, but on a plant scale, stainless steel is preferred. For some vessels, aluminium or alloys thereof may be used, but preferably after their internal surfaces have been passivated, such as by treatments with nitric and phosphoric acids.

Having described the invention in general terms, specific embodiments thereof will now be described in greater detail by way of example only.

EXAMPLES 1 and 2

In these Examples, a disubstituted naphthoquinone was dissolved in 25 ml of a mixture of p-xylene and o-methylcyclohexylacetate (50/50 by volume) at a concentration of 2.6 mM containing 0,166 ml trioctylamine (0.38 mM). The solution was degassed and charged into a thick walled glass vessel that was closed to the atmosphere and held at ambient room temperature, about 23° C. in a water bath. Hydrogen sulphide was passed through the solution for 2 hours at a pressure of between 2 and 3 atmospheres. Residual hydrogen sulphide was degassed from the solution, and the vessel was opened to atmosphere. Water (10 ml) was added and oxygen gas was bubbled through the solution for an hour. The organic and aqueous phases were separated in a separating funnel and the hydrogen peroxide content of the aqueous phase determined by a standard iodometric/thiosulphate technique. The measured hydrogen peroxide content was compared with the theoretical content achievable by complete reduction and oxidation of the naphthoquinone.

In Example 1, 2,3-dimethyl-1,4-naphthoquinone was employed and the yield of hydrogen peroxide was 97.4% of the theoretical maximum. In Example 2, 2-ethyl,3-methyl-1,4-naphthoquinone was employed and the yield of hydrogen peroxide was 94.3% of the theoretical maximum.

From these two Examples, it can be seen that both stages, namely reduction of the naphthoquinone and subsequent oxidation of the resultant naphthoquinhydrone have proceeded nearly quantitatively.

EXAMPLE 3

In this Example, Example 1 was repeated but at a concentration of dimethylnaphthoquinone of only 1.3 mM. The yield of hydrogen peroxide was still 96.3% of the theoretical maximum.

EXAMPLE 4

In this Example, the procedure of Example 1 was repeated, but employing 2-methyl,3-phytylnaphtho-1,4-quinone at a concentration of 2.2 mM. The yield of hydrogen peroxide produced was 94.8% of the theoretical maximum.

EXAMPLE 5 AND 6 AND COMPARISON 7

In this Example and comparison, the relative rates of reduction were measured of a naphthoquinone according to the present invention and the fastest anthraquinone.

The trials were conducted by first dissolving a quinone to the same known concentration, 0.25M, in a solvent mixture, 10 ml, in the presence of an amine catalyst, tri-n-octylamine, 0.167 ml, 38 mM, and bringing that mixture into contact with the same known measured volume of hydrogen sulphide 724.3 ml that is very much larger than the volume of solution at a temperature maintained at 25° C. The pressure of the hydrogen sulphide gas was the same at the start of each run and the reaction was followed by monitoring at 20 second intervals the diminution of pressure in the vessel using a digital manometer, thereby measuring hydrogen sulphide uptake by the solution. Blank trials were conducted under otherwise identical conditions in the absence of quinone to determine a corrective factor for hydrogen sulphide absorbed by the solvents. From each graph of corrected hydrogen sulphide uptake against time, a reaction rate was calculated.

In Examples 5 and 6, the solvent mixture comprised p-xylene and o-methylcyclohexanolacetate (50/50 by volume) and the quinones were respectively 2-ethyl,3-methylnaphthoquinone (EMN) and 2,3-dimethylnaphthoquinone (DMN). The reaction rates were respectively 0.0036 for EMN and 0.0045 for DMN. In Comparison 7, the solvent mixture comprised p-xylene/diisobutylcarbinol (60/40% by volume) and the quinone was 2-amyltetrahydroanthraquinone. Its reaction rate was 0.0018 under otherwise the same conditions.

A comparison between the results for the invention quinones and the prior art quinone reveals that the invention quinones reacted about twice as fast as the prior art quinone, or even better, which is a very significant and substantial practical benefit, in that it reduces substantially the residence time needed to attain the same extent of quinone reduction and thus either reduces the capital cost of the plant of a given throughput or increases the throughput of a plant of a given size.

Similar kinetic trials were conducted with regard to the oxidation of quinhydrone formed in the reduction stage, using the same trial apparatus, but oxygen as the gaseous phase. The results indicated that the rate constant was about 0.0038 for EMN and 0.0034 for DMN, so that for each naphthoquinone, the combined time for both the reduction and the oxidation stages was about the same as the time taken by the prior art anthraquinone ATQ for the reduction stage alone so that the combined time for reduction and oxidation of ATQ is longer than that for the naphthaquinones by substantially the entire oxidation reaction time.

We claim:

1. A process for the production of elemental sulphur from hydrogen sulphide in which hydrogen sulphide is brought into contact with a reducible quinone compound dissolved in a non-aqueous solvent system in the presence of an organic amine catalyst and maintained in contact until at least some sulphur precipitates out of solution characterised in that the reducible quinone compound comprises a 2,3-dialkyl substituted naphthaquinone.

2. A cyclic process for the generation of hydrogen peroxide in which in the first step hydrogen sulphide is brought into contact with a reducible quinone compound dissolved in a non-aqueous solvent system in the presence of an organic amine catalyst and maintained in contact until at least some sulphur precipitates out of solution, thereby reducing at least a part of the quinone in solution to a reduced species, in a second step contacting the reduced species in solution with an oxygen-containing gas, thereby oxidising at least a part of the reduced species to a quinone and forming hydrogen peroxide, and in a third step recovering the hydrogen peroxide from the solvent system characterised in that the reducible quinone compound comprises a 2,3-dialkyl substituted naphthaquinone.

3. A process according to either claim 1 or 2 characterised in that the naphthoquinone contains no more than 18 carbon atoms.

4. A process according to claim 3 characterised in that the total number of carbons in the alkyl substituents at the 2 and 3 positions around the naphthoquinone nucleus is from 2 to 6.

5. A process according to claim 4 characterised in that one of the alkyl substituents at the 2 and 3 positions is methyl.

6. A process according to claim 4 characterised in that the alkyl substituents at the 2 and 3 positions are different from each other.

7. A process according to claim 4 characterised in that at least one of the substituents at the 2,3 positions is selected from the group consisting of ethyl, propyl, iso-butyl, t-butyl, amyl and iso-amyl.

8. A process according to claim 4 characterised in that one of the substituents at the 2,3 positions is methyl and the other is ethyl.

9. A process according to claim 1 or 2 characterised in that the amine catalyst has a pK of from about 9 to 11.5.

10. A process according to claim 1 or 2 characterised in that the amine catalyst is employed at a concentration of at least 0.1 mole per liter.

11. A process according to claim 1 or 2 in which the solvent system comprises a mixture of a hydrophobic high boiling component and a more hydrophilic component miscible therewith.

12. A process according to claim 11 characterised in that the hydrophobic component comprises a hydrocarbon or mixture of hydrocarbons boiling at a temperature of at least about 150° C. and the more hydrophilic component comprises an alcohol, ester or ketone miscible therewith.

13. A process according to claim 1 or 2 characterised in that the reduction step is conducted at a temperature of from 10° to 60° C.

14. A process according to claim 2 characterised in that sulphur produced in the reduction step is removed from the solution before the oxidation step is conducted.

15. A process according to claim 2 characterised in that the oxidation step is conducted at a temperature of from 20° to about 60° C.

16. A process according to claim 2 characterised in that in the extraction step, the aqueous extractant has a pH of not lower than about pH5.

17. A process according to claim 12 wherein the volume ratio of the hydrophobic high boiling component and the more hydrophilic component is from 80:20 to 20:80.

18. A process according to claim 1 or 2 characterized in that the reducible quinone compound comprises a 2,3-dialkyl naphthoquinone in which one of the alkyl substituents is methyl and the other is selected from the group consisting of ethyl, propyl, isobutyl, t-butyl, amyl and iso-amyl, and in which process the organic amine catalyst is present in a concentration of at least 0.1 moles per liter and has a $pK_a$ of from about 9–11.5.

* * * * *